United States Patent
Johnson

(10) Patent No.: US 7,992,902 B2
(45) Date of Patent: Aug. 9, 2011

(54) AIR HOSE END-CONNECTOR FITTING FOR WINTER OPERATION OF SERVICE STATION TIRE INFLATOR MACHINES

(76) Inventor: Oriz W. Johnson, Westchester, OH (US)

( * ) Notice: Subject to any disclaimer, the term of this patent is extended or adjusted under 35 U.S.C. 154(b) by 0 days.

(21) Appl. No.: 12/456,235

(22) Filed: Jun. 15, 2009

(65) Prior Publication Data

US 2010/0314867 A1 Dec. 16, 2010

(51) Int. Cl.
*F16L 33/00* (2006.01)
(52) U.S. Cl. .......................................... 285/256; 138/30
(58) Field of Classification Search .................. 285/256; 138/30, 32, 27
See application file for complete search history.

(56) References Cited

U.S. PATENT DOCUMENTS

| | | | | | |
|---|---|---|---|---|---|
| 863,745 | A | * | 8/1907 | Nelson et al. | 285/222.3 |
| 1,808,101 | A | * | 6/1931 | Eastman | 285/256 |
| 2,028,316 | A | * | 1/1936 | Brunner | 285/256 |
| 2,147,353 | A | * | 2/1939 | Scholtes | 285/148.16 |
| 2,273,397 | A | * | 2/1942 | Couty | 285/278 |
| 2,319,586 | A | * | 5/1943 | Clench | 285/256 |
| 3,123,072 | A | * | 3/1964 | Bellamy, Jr. | 604/263 |
| 3,990,729 | A | * | 11/1976 | Szentmihaly et al. | 285/109 |
| 4,840,408 | A | * | 6/1989 | Nishiki et al. | 285/62 |
| 6,131,613 | A | * | 10/2000 | Jenski et al. | 138/30 |
| 2005/0257834 | A1 | * | 11/2005 | Johnson | 137/375 |

* cited by examiner

*Primary Examiner* — Aaron Dunwoody

(57) ABSTRACT

An air hose end-connector fitting for freeze-free operation of outdoor service station air machines in winter weather having an internal ice particle screening tube and storage chamber is disclosed, the internal ice particle screen defines a perforated tube within the connector fitting airway which screens out overly-large air borne ice particles, the storage chamber defines a dedicated hollow section within the connector fitting which stores the screened-out ice particles till thawed.

1 Claim, 1 Drawing Sheet

US 7,992,902 B2

AIR HOSE END-CONNECTOR FITTING FOR WINTER OPERATION OF SERVICE STATION TIRE INFLATOR MACHINES

CROSS REFERENCES TO RELATED APPLICATIONS

None.

FEDERALLY SPONSORED RESEARCH

None.

MICROFICHE APPENDIX

None.

BACKGROUND OF THE INVENTION

1. Field of the Invention
Class 285/238/239/242
2. Discussion of the Prior Art

Of the literally millions of air hoses in use today, the overwhelming majority are employed indoors for mechanical air tools and are not susceptible to winter time freezing. No need exists nor thought given to protecting systems and hose connectors from freezing up. Indoor systems not withstanding, there are more than a hundred thousand automobile tire inflator machine systems located outdoors, primarily at gasoline service stations serving the driving community and used by customers year round, night or day, summer or winter. These outdoor systems are necessarily minimalist in nature and employ the same minimum effort air hose connector devices as the indoor systems. The system hoses frequently freeze up in winter making the systems inoperative. There is a question as to why some hoses freeze and others nearby in identical weather do not. After extensive cold-chamber study and testing by the applicant it was determined that the more active hoses froze and the lesser ones regardless of the weather did not. It requires frequent usage in very dry winter air for sufficient water vapor to be injected into the system to form ice particles large enough to create a problem. A hose used once a month will never freeze up, a hose used ten times a day is almost a freeze up certainty. It is then, that during winter when the outdoor temperature drops below freezing, atmospheric water vapor introduced into the filling hose in each compression cycle will condense on the walls of the airway along its length to liquid water and if cold enough to ice. As the ice builds up and as the hose is flexed during the tire inflation activity frequently goodly pieces of ice break off the walls and are carried or pushed by the high pressure air stream toward the outlet end of the hose. The ice particles if they meet any type of obstruction within the hose or attached filling gauge pile up and effectively block the airway until thawed. While the above is straight forward, no practical method or means has been found heretofore to prevent it in the twenty five or so years of outdoor air machine popularity. It develops that the internal configuration of the conventional minimum-effort hose end connector device is in fact the almost sole contributor to ice obstruction and improvement measures of the device are the focus of this invention. Examination of brochures and catalogs of the major connector manufactures displaying hundreds of connector designs by presumably the most skilled designers in the world finds no configuration comparable to the proposed geometry.

OBJECTIVE AND ADVANTAGES OF THE INVENTION

The advantages of the invention to the location owner are better revenues from his coin-operated air machine and better customer service for customers who frequently need air in their tires in early morning to get to work. Not only a chilling disappointment for those in need to find a frozen hose but then to drive on risky under-inflated tires to the next machine only to sadly find it also frozen. While loathe to claim all, the improved connector as proposed can eliminate the very vast majority of these winter weather ice problems.

SUMMARY OF THE INVENTION

The essence of the invention, since it cannot prevent the formation of ice is to first minimize its influence and secondly to create a cavity within the connector device itself to capture and store the ice particles harmlessly until such time as they are melted by warmer weather and blown out as water.

LIST OF REFERENCE NUMBERS

Figure 1:
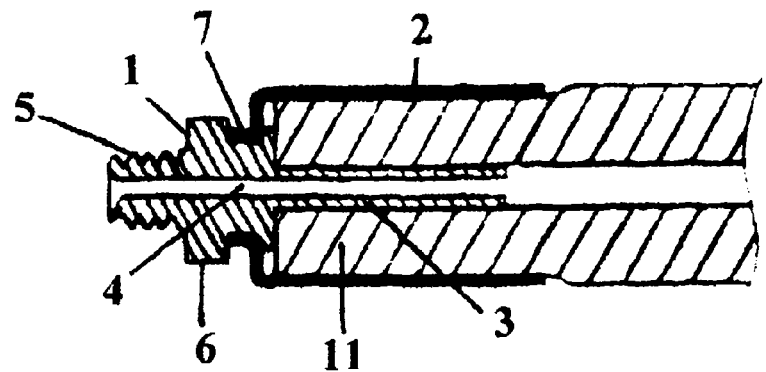
FIG. 1: A cutaway view of a prior art air hose connector fitting showing the body of the connector, the barb insertion tube, and the ferrule sleeve fixedly attached, crimped, to the end of an air hose.

Cylindrical metal body of the connector 1
Elongated and enlarged cylindrical ferrule 2
Hose insertion barb 3
Large inside diameter 3A
Bore through fitting body 4
Male threads 5
Wrench lands 6
Circumferential groove 7
End of enlarged section 8
Point of hose diameter 9
Ferrule crimped on hose 10
Air hose 11
Perforated ice particle screen 12
Non-perforated tube water weir 13
Ice particle storage chamber 14

DESCRIPTION OF THE INVENTION

Figure 2:
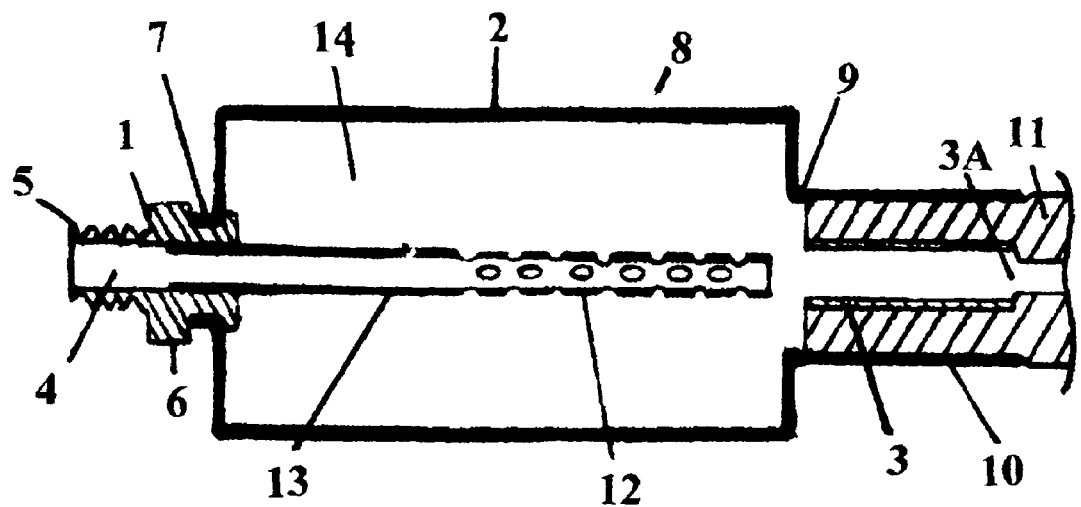
FIG. 2: A cutaway of the fitting showing the hose reamed to accept the remote insertion barb, the enlarged cylindrical ferrule sleeve for ice particle collection and storage and the perforated ice particle screening tube.

FIG. 2 generally shows the proposed hose-end connector fitting showing a cylindrical body 1, combination ice trap and ferrule sleeve 2, and remote insertion barb 3. The cylindrical body 1 has an enlarged inline airway bore 4 through from first end to second end at its longitudinal centerline. The first end of the cylindrical body is threaded with male threads 5 suitable for attaching a female tire inflator device and the cylindrical body adjacent to the male threads has a plurality of diametrically opposed flats 6 serving as wrench lands. The second end of the cylindrical body having a circumferential groove 7 near its end onto which the first end of a cylindrical ferrule sleeve is crimped, welded or otherwise fixedly attached. The diameter of the ferrule sleeve 2 is approximately doubled immediately after the crimp and extended in length thus creating a hollow chamber 14 for ice particle storage within the ferrule enclosure. The cylinder further extended 10 after the point of reduction sufficiently for suitably crimping onto an air hose 11. The remote insertion barb 3 is inserted flush into the end of any hose to be attached and has an inside diameter 3A larger than said hose. The first end of a perforated air flow ice screening tube 12 is fixedly inserted water tight into the bore of the connector body. The tube second end extending into the hollow chamber of the enlarged cylinder ferrule.

Approximately half 13 of the perforated screening tube nearest the body is not perforated so to act as a water weir.

Ramifications and Scope of the Invention:

While the above description of my preferred embodiment contains many specificities, these should not be construed as limitation on the scope of the invention, but rather as an exemplification of the one preferred embodiment thereof. It is possible to reach somewhat similar results as my invention by creating a simple storage chamber by creating a gap between hose and connector end within the standard ferrule or reversibly, to simply increase the id of the hose and barb without the chamber, or to eliminate the barb entirely and cement the hose into a ferrule, or to ream out the hose and install a flush barb, or to outfit the ferrule with internal teeth like protrusions that grip the hose when crimped onto the hose even without a barb, or to use other screens or exclude a screening device entirely or to create a separate chamber immediately upstream of the connector. Many other variations of virtually every concept or component defined are possible, accordingly the scope of the invention should be determined not by the embodiment illustrated but by the appended claims and their legal equivalents.

I claim:

1. An air hose end-connector fitting for improved winter operation of outdoor service station automobile tire inflator air machines, said hose end-connector fitting comprising:

a cylindrical body having a first end and a second end, said first end terminating in male threads suitable for attaching a tire inflator gauge, said second end terminating fixedly attached in-line to a cylindrical ferrule sleeve, said cylindrical body further having an airway bore thru from first to second end;

a cylindrical ferrule sleeve having a first end, and a second end, said first end fixedly attached inline onto second end of aforementioned cylindrical body, said second end of the female sleeve suitable for being inserted onto and fixedly attached to the end of an air machine air hose, the end of said air hose fixed at a predetermined distance from the second end of the cylindrical body thus creating a hollow chamber within the ferrule sleeve between second end of said cylindrical body and fixed end of said air hose;

an internal air flow ice particle screening tube having a first end and a second end, said first end of said screening tube fixedly inserted water tight into aforementioned cylindrical body airway bore, second end of said screening tube projecting a pre-determined distance into aforementioned hollow chamber within the ferrule sleeve, a pre-determined length of said screening tube at this second end having a plurality of perforated air holes; and a remote insertion barb located coaxially within the second end of said cylindrical ferrule.

* * * * *